D. H. Swartz,
Bee Hive.
No. 111,273.    Patented Jan. 24, 1871.
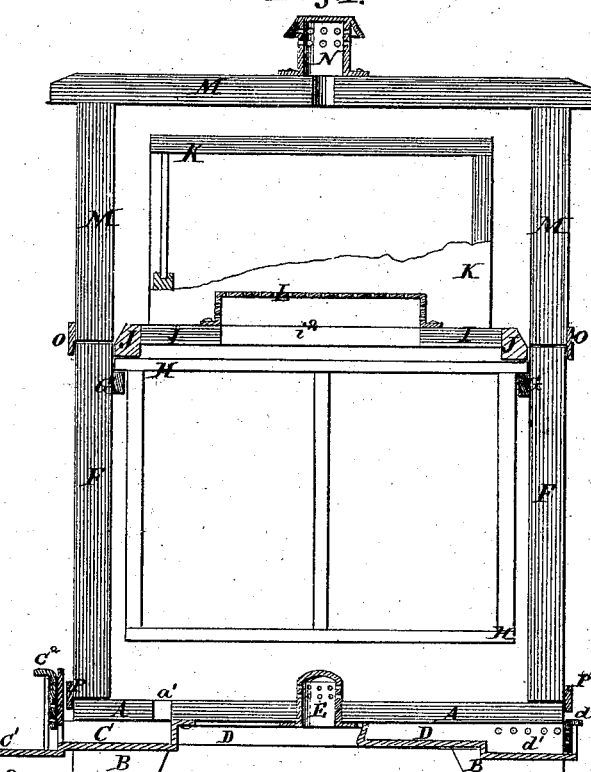
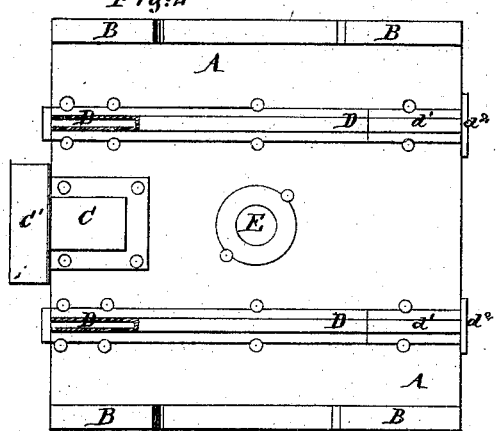
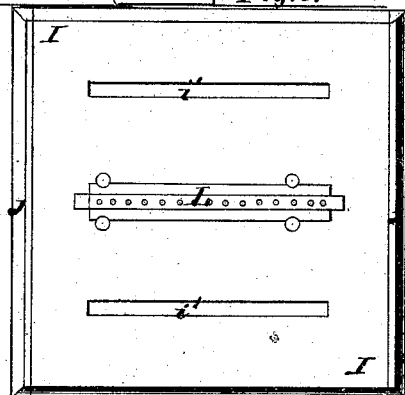
Witnesses
M. Vorlander
D. S. Mabee
Inventor
D. H. Swartz
per Munn & Co.
Attorneys

United States Patent Office.

DAVID H. SWARTZ, OF LANCASTER, OHIO.

Letters Patent No. 111,273, dated January 24, 1871.

IMPROVEMENT IN BEE-HIVES.

The Schedule referred to in these Letters Patent and making part of the same.

*To all whom it may concern:*

Be it known that I, DAVID H. SWARTZ, of Lancaster, in the county of Fairfield and State of Ohio, have invented a new and useful Improvement in Bee-Hives; and I do hereby declare that the following is a full, clear, and exact description thereof, which will enable others skilled in the art to make and use the same, reference being had to the accompanying drawing forming part of this specification, in which—

Figure 1 is a vertical longitudinal section of my improved bee-hive, parts being broken away to show the construction.

Figure 2 is an under side view of the bottom of the hive, part of the moth-trap being broken away to show the construction.

Figure 3 is a top view of the horizontal partition that separates the upper and lower parts of the hive.

Similar letters of reference indicate corresponding parts.

The purpose of my invention is to form an improved trap for the destruction of moths, and also to produce an improved system of ventilation.

A is the bottom of the hive, which is provided with short feet or legs B, to support the hive free from the surface of the table or platform upon which it stands.

C is the bee entrance to the hive, which is made of tin, and is attached to the forward part of the under side of the bottom A, so as to cover a small vertical hole, $a'$, through the bottom A of the hive, as shown in fig. 1.

The forward end of the passage C is provided with a slide, $c^2$, to close the entrance to said passage, which slide is perforated, to allow the air to pass through freely.

The construction of the entrance-passage also enables the entrance to be more easily guarded by the bees to prevent the entrance of moths.

D are long passages made of tin, and attached to the under side of the bottom A upon each side of the passage C.

The forward ends of the passages D are left open for the moths to enter, when they find they cannot enter through the passage C.

The rear ends of the passages D are enlarged, to form chambers $d^1$, the sides of which are perforated, to admit the light, so that the moths, when they enter the forward ends of said passages may see the light, and, seeking it, may thus find their way into the chambers $d^1$, from which they cannot find their way out, and, after fluttering about for a short time, will die.

The rear ends of the chambers $d^1$ are closed with slides $d^2$, which should also be perforated, and which may be removed for the removal of the dead moths from the said chambers $d^1$.

In the central part of the bottom A is formed a hole, into which is closely fitted and secured a short tube, E, closed at its upper end, and perforated with numerous holes, to allow the air to pass into the hive freely, to ventilate it.

I is the horizontal partition that separates the interior of the hive into two parts.

To the side edges of the partition I are attached strips J, that project below the under surface of the said partition I, and rest upon the end parts of the the top bars of the comb-frames H, directly above the strips G that support said frames, thus leaving a clear space between the tops of the comb-frames H and the lower surface of the partition I.

In the partition I, between the honey-boxes K, is formed a slot, $i^2$, which is covered by a cap, L, projecting upward between the honey-boxes K, and having its sides, ends, and top finely perforated, to allow the air to pass up freely.

M is the upper part of the body of the hive.

In the top of the part M is formed a hole, over which is secured a tube or dome, N, the upper end of which is covered with a close cap, and the sides of which are finely perforated, to allow the air to pass through freely.

Having thus described my invention,

I claim as new and desire to secure by Letters Patent—

1. The passages D, open at their front ends, and having side-perforated chambers $d^1$ at their rear ends applied to the bottom A and on each side of the passage C, of a bee-hive, for the purpose of attracting the moths and promoting their destruction.

2. The tube E at the bottom, the tube N at the top, and the cap L between them, all combined as described, to afford a free circulation of air through the hive.

DAVID H. SWARTZ.

Witnesses:
U. C. RUTTER,
S. P. EWING